Patented Jan. 12, 1932

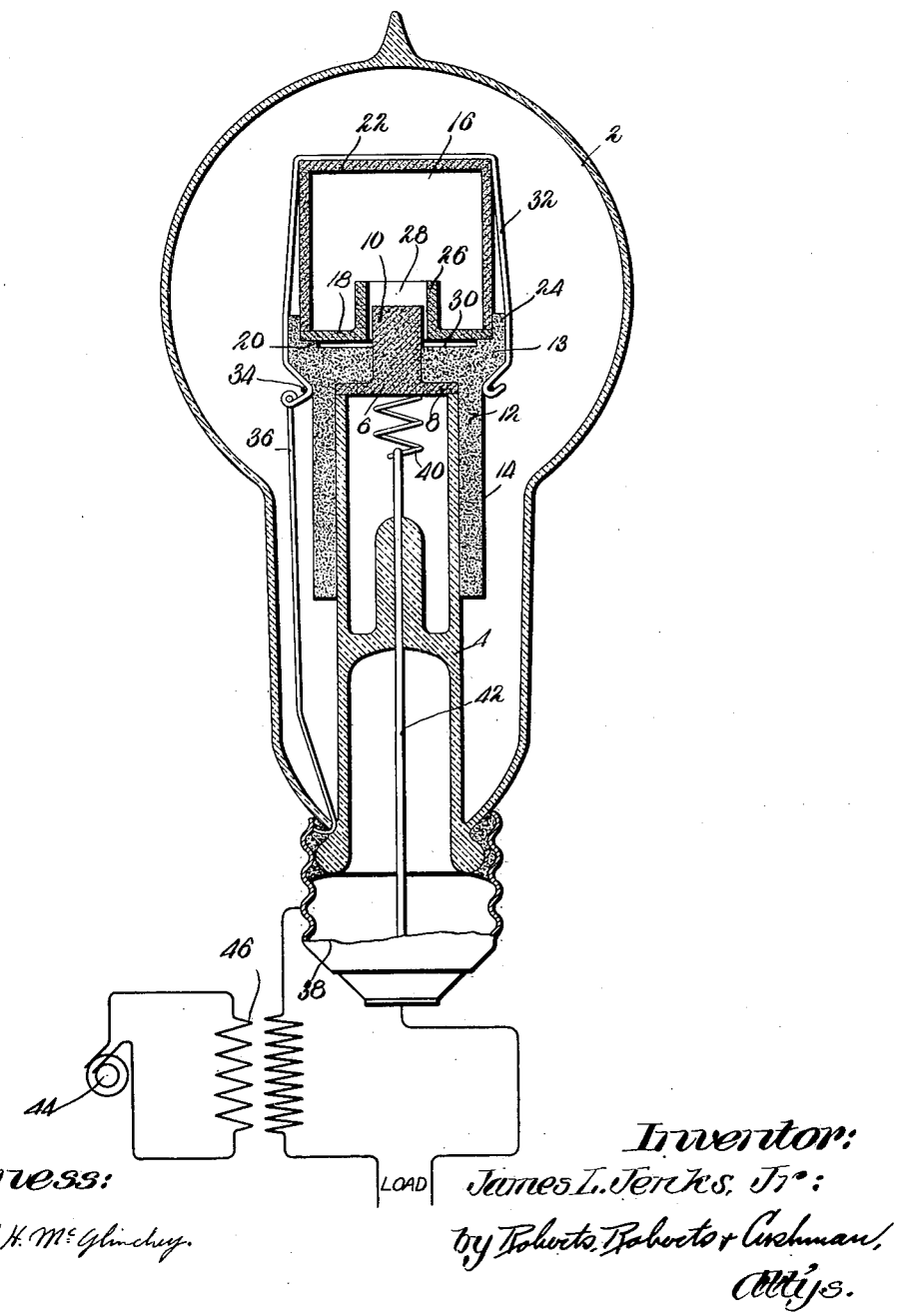

1,841,288

UNITED STATES PATENT OFFICE

JAMES L. JENKS, JR., OF MEDFORD HILLSIDE, MASSACHUSETTS, ASSIGNOR, BY MESNE ASSIGNMENTS, TO RAYTHEON INC., OF CAMBRIDGE, MASSACHUSETTS, A CORPORATION OF MASSACHUSETTS

ELECTRIC DISCHARGE DEVICE

Application filed November 29, 1924. Serial No. 752,867.

The present invention relates to electrical apparatus and more particularly to gaseous conduction apparatus in which electrical conduction is caused to take place by gaseous ionization between the electrodes.

One of the principal disadvantages of the usual form of gaseous conduction tube lies in the fact that the continued operation of the tube causes disintegration of the conduction members, and the surfaces of the receptacle and the electrode support become blackened, thereby causing non-uniform electrical stresses throughout the tube and making its operation irregular and erratic. This effect has been found to be caused by the presence of a gaseous discharge adjacent the insulating material which usually forms a part of the receptacle.

A principal object of the present invention is to provide simple improvements in apparatus of this general nature whereby such disintegration and blackening may be prevented and the regular and uniform operation of the apparatus may be secured even after long continued use.

One feature of the invention includes the provision of a member of dielectric material which covers the parts of the receptacle or electrode supports in which undesirable discharges have heretofore been allowed to take place.

Another feature of the invention lies in the provision of means for covering or enclosing predetermined portions of the electrode surfaces with a dielectric member so that the discharge and electrical stresses will be confined to such surfaces. This latter feature is of especial importance in connection with carbon electrodes, in which the presence of even a small amount of impurity causes "sputtering" or disintegration of the electrode surface under electrical stresses. According to the present invention this effect, in so far as it exists, is entirely confined to the relatively small active surface area of the electrode.

The invention also comprehends fixedly spacing the electrodes in their relative positions each to each by means of the dielectric member and preferably in providing a thin gas film of permanent, uniform thickness therebetween.

The invention accordingly consists in the features of construction, combinations of elements, and arrangements of parts as will be exemplified in the structure to be hereinafter described and the scope of the application of which will be indicated in the following claims.

The accompanying drawings illustrate a preferred form of the invention, as embodied in a rectifier tube included in a simple rectifying circuit.

The invention is herein illustrated and described as embodied in a gaseous conduction tube of the type disclosed in the copending application of Smith, Serial No. 526,095, filed December 31, 1921, patented February 8, 1927, Patent No. 1,617,179, which depends for its rectifying effect upon the great difference in mobility of the electron and the positive ion, which is taken advantage of by the special shapes and spacing of electrodes. The illustrated embodiment of the invention comprises a gas filled receptacle 2 of glass provided with a reentrant or internal stem 4. The upper end of the stem carries an anode 6, preferably of carbon, provided with a flange base portion 8, and an upstanding central projection 10. A thimble 12 of dielectric material is received over the anode, the thimble being provided with a central opening to accommodate the projection 10, and a long downwardly extending portion 14 which fits snugly around the stem 4. Although any dielectric of sufficiently high insulating qualities is suitable for the thimble 12, it has been found preferable, for some reason which is not perfectly understood, to use lava, or other dielectric material which also possesses high refractory or high porous qualities or both qualities. The thimble is enlarged at 13 to support a cathode, also of carbon and preferably of hollow construction, as indicated generally at 16. The cathode consists of a base 18 resting upon an annular ledge 20 of the thimble, and a cover 22 which fits closely over the base. The cover portion 22 fits within an annular projecting sleeve 24 of the thimble. The central portion of the base 18 is formed with a central opening which is surrounded by a sleeve 26. The sleeve 26 thus encloses a central ionizing passage 28, into which the cylindrical projection 10 of the anode extends. It is evident that the upstanding sleeve serves as an obstruction or shield to the passage of material sputtered radially from the active surface of the anode, thus preventing the accumulation of débris on the upper surface of thimble 12. The surfaces of the projection 10 and the sleeve 26 are essentially parallel and spaced apart a distance which is of the order of magnitude of the mean free path of electrons in the gas, so that no conduction can take place immediately between these surfaces. The formation of the ledge 20 leaves a small space or gap 30 immediately below the base of the cathode. This space should also be of approximately the magnitude of the mean free path of the electrons in the gas, thus forming a high resistance gap between the opposing surfaces of the cathode and the thimble. The cathode is retained in position by a wire 32 which extends over the cathode and is secured in position by a binding wire 34 encircling the thimble below the enlargement 13. The wire 32 also serves as the lead wire for the electrode, a connection being made from the wire through a conductor 36 to the shell of a plug 38 of usual form. The connection is made to the anode through a spring 40 to which is secured a lead wire 42 sealed into the glass stem and connected to the bottom portion of the plug. As explained in the copending Smith patented application above referred to, the cooperation of the hollow cathode with the anode gives a rectifying effect through the accumulation of a space charge of positive ions in the cathode. The tube is illustrated as included in a simple rectifying circuit consisting of an alternating current generator 44, a transformer 46, and a suitable direct current load.

It will be seen that the lava thimble coacts to close off the interior of the cathode, the active surface of the latter being thus enclosed, and that the thimble also surrounds portions of the anode 10 while leaving the active surface of the latter available for the intended coaction with the active surface of the cathode. These active surfaces are the upper end of the projection 10 and the interior of the hollow cathode 16. The peripheral surface of the projection 10 is separated from the inner surface of sleeve 26 by a uniform annular film of gas in the intervening annular space, while the lower surface of base 18 is separated from the upper surface of thimble 12 by the uniform disc-shaped film of gas filling the disk-shaped space indicated at 30. These gas films separate the closely associated parts of the electrodes where sparking and like discharge phenomena are apt to occur and serve as insulation media in opposition thereto.

The lower extension of the thimble also covers and protects the glass stem against the possibility of any discharges occurring adjacent to it. It will be observed from the drawing that any paths for the electrical conduction through the thimble itself are relatively long so that electrical stresses in the thimble itself are not sufficient to be of any consequence. The recess, encompassed by the ledge 20, in the thimble which provides the short gaseous space or gap 30 of high resistance, as above pointed out, especially precludes any excessive stresses, either in this portion of the gaseous medium or in the central portion of the thimble itself, while actual contact of the thimble with the cathode occurs only at or near the peripheral margin. Thus the shortest possible electric lines of stress in the lava extend between the outer corners of the anode and the cathode. The restricted gaseous space 30 has been found also to prevent any longitudinal discharge between the projection 10 of the anode and the lower surface of the cathode.

In the construction thus provided, the discharge between the cathode and anode is controlled and directed and limited to predetermined portions of the surfaces thereof, while the other and remaining portions of electrode surface and of adjacent surfaces of the supporting elements are positively protected against spurious discharge, thereby precluding the possibility of exposing the surface of the cathode to the effects of "sputtering" or disintegration.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. An electrical apparatus comprising a gas filled receptacle having an internal stem, an electrode supported on the stem, a thimble of dielectric material contacting with and covering a portion of the electrode and extending over the stem beyond the electrode, and a second electrode with an opening therein through which said second electrode cooperates with the uncovered portion of the first electrode, said thimble and said second electrode having interfitting portions for alining the opening in said second electrode relative to said first electrode.

2. An electrical apparatus comprising a gas filled receptacle having an internal stem, an electrode supported on the stem, a thimble of dielectric material covering a portion of the electrode and extending over the stem beyond the electrode, and a second electrode cooperating with said first-mentioned electrode for gaseous conduction therebetween and characterized by a hollow space therein, with an opening thereto, said opening being in opposed relationship to the exposed portion of the first electrode, said thimble and said second electrode having interfitting portions for maintaining said opposed relationship.

3. An electrical discharge device comprising, in combination, a gas-filled receptacle having an internal stem, an insulating thimble seated upon said stem and having a part extending downwardly about said stem, said thimble having an opening therein within its lateral expanse, an electrode extending through said opening in said thimble, and an electrode having side walls and a bottom wall, said bottom wall having an opening therein into which said first-mentioned electrode projects, and the periphery of the opening in said bottom wall being spaced from said first-mentioned electrode by a distance less than that at which substantial ionization takes place.

4. An electrical discharge device comprising, in combination, a gas-filled receptacle having an internal stem, an insulating thimble seated upon said stem and having a part extending downwardly about said stem, said thimble having an opening therein within its lateral expanse, an electrode extending through said opening in said thimble, and an electrode having side walls and a bottom wall, said bottom wall having an opening therein into which said first-mentioned electrode projects, and a portion of one of said electrodes being spaced from a portion of said thimble by a distance less than that at which substantial ionization takes place.

5. An electrical discharge device comprising, in combination, a gas-filled receptacle having an internal stem, an insulating thimble seated upon said stem and having a part extending downwardly about said stem, said thimble having an opening therein within its lateral expanse and a stepped portion spaced from said opening, an electrode extending through said opening in said thimble, and an electrode having side walls and a bottom wall, said bottom wall having a portion interfitting with said stepped portion and having an opening therein into which said first-mentioned electrode projects, and portions of said two electrodes being spaced by a distance less than that at which substantial ionization takes place, and a portion of one of said electrodes and a portion of said thimble being spaced by a distance less than that at which substantial ionization takes place.

6. An electrical discharge device comprising, in combination, a gas-filled receptacle having an internal stem and insulating means carried by said stem, said stem and said insulating means being shaped to interfit, said insulating means having an opening therein and a stepped portion spaced from said opening, an electrode passing through said opening in said insulating means, an electrode carried by said insulating means and having an opening therein into which said first-mentioned electrode projects and having a portion engaging said stepped portion of said insulating means, said stepped portion spacing a part of said second-mentioned electrode from a part of said first-mentioned electrode by a distance insufficient to maintain substantial conduction therebetween.

7. An electrical discharge device comprising, in combination, a gas-filled receptacle having an internal stem and insulating means carried by said stem, said stem and said insulating means being shaped to interfit, said insulating means having an opening therein and a stepped portion spaced from said opening, an electrode passing through said opening in said insulating means, an electrode carried by said insulating means and having an opening therein into which said first-mentioned electrode projects and having a portion engaging said stepped portion of said insulating means, said stepped portion spacing a part of said second-mentioned electrode from a part of said insulating means by a distance less than that at which substantial ionization takes place.

8. An electrical discharge device comprising, in combination, a gas-filled receptacle, an insulating member supported therein, said insulating member having an opening above which side portions of said insulating member extend but spaced laterally away from said opening, an electrode member passing through said opening in said insulating member, and a coacting electrode fitted to said side portions of said insulating member, said side portions holding a part of said coacting electrode spaced from one of said members by a distance less than that necessary to maintain substantial gaseous conduction.

9. An electrical discharge device comprising, in combination, a gas-filled receptacle, an insulating member supported therein, said insulating member having an opening above which side portions of said insulating member extend but spaced laterally away from said opening, an electrode member passing through said opening in said insulating member, and a coacting electrode member having a flanged opening therein of a size greater than the cross-section of said first-mentioned electrode member, said side portions of said insulating member holding said coacting electrode member in a position to substantially aline said electrode member with respect to said flange opening, a portion of said insulating member being separated from one of said electrode members and the flange about said flanged opening being separated from said first-mentioned electrode member by connected spaces, the width of each of which is less than that necessary to maintain substantially gaseous conduction between the separated parts.

10. An electrical discharge device comprising, in combination, a gas-filled receptacle, an insulating member supported therein, said insulating member having an opening, above which side portions of said insulating member extend but spaced laterally away from said opening, an electrode member passing through said opening in said insulating member, and a coacting electrode having a flanged opening therein of a size greater than the cross-section of said electrode member, said side portions of said insulating member holding said coacting electrode in a position to substantially aline said electrode member with respect to said flanged opening, the wall of said flanged opening being spaced from said electrode member by a distance insufficient to maintain substantially gaseous conduction therebetween.

11. An electrical discharge device comprising, in combination, a gas-filled receptacle, an insulating member supported therein, said insulating member having an opening above which side portions of said insulating member extend but spaced laterally away from said opening, an electrode member passing through said opening in said insulating member, a two-part coacting electrode, one part of which has a flanged opening into which said electrode member projects and which is engaged by said side portions of said insulating member and the other part of which is secured to said first part and substantially encloses the space above said first-mentioned part.

12. An electrical discharge device comprising, in combination, a gas-filled receptacle, an insulating member supported therein, said insulating member having an opening, above which side portions of said insulating member extend but spaced laterally away from said opening, an electrode member passing through said opening in said insulating member, a two-part coacting electrode, one part of which has a flanged opening into which said electrode member projects and which is engaged by said side portions of said insulating member and the other part of which is secured to said first part and substantially encloses the space above said first-mentioned part, the wall of said flanged opening in said one part being separated from said electrode member and the latter being separated from a portion of said insulating member by connected spaces, the width of each of which is less than that necessary to maintain substantial gaseous conduction between the separated parts.

13. An electrical discharge device comprising, in combination, a gas-filled receptacle, an insulating member supported therein, said insulating member having an opening above which side portions of said insulating member extend but spaced laterally away from said opening, an electrode member passing through said opening in said insulating member, a two-part coacting electrode, one part of which has a flanged opening into which said electrode member projects and which is engaged by said side portions of said insulating member and the other part of which is secured to said first part and substantially encloses the space above said first-mentioned part, the wall of said flanged opening in said one part being spaced from said electrode member by a distance insufficient to maintain substantial gaseous conduction therebetween, and a portion of said insulating member being spaced from one of said electrodes by a distance insufficient to maintain substantial ionization.

14. Electrical discharge apparatus including a vessel having a gaseous content, an anode therein, means of conducting material presenting a surface adapted to coact with said anode in maintaining discharge therebetween, said conductive means having an opening therein through which said anode is presented to said surface, said means and said anode having portions spaced from each other, insulating material bridging the space between said portions, and means interposed between the active surface of said anode and said insulating material for shielding the latter from material driven off the anode by the impinging discharge.

15. Electrical discharge apparatus including a vessel having a gaseous content, an anode therein, means of conducting material presenting a surface adapted to coact with said anode in maintaining discharge therebetween, said conductive means having an opening therein through which said anode is presented to said surface, said means and said anode having portions spaced from each other, insulating material bridging the space between said portions, and means interposed between the active surface of said anode and said insulating material for shielding the latter from material driven off the anode by impinging discharge, said interposed means being electrically conductive to be maintained at substantially the same potential as said first-mentioned means.

16. An electrical discharge device comprising, in combination, a gas-filled receptacle having an internal stem open at its inner end, an insulating thimble seated upon said stem and having a part extending downwardly about said stem, said thimble having an opening in its upper portion substantially coaxial with the open end of said stem, an anode substantially fitted into said opening and having a portion exposed above said thimble and a portion exposed to the open end of said stem, said downwardly extending part of said thimble holding the latter and said anode against displacement in a direction transversely of said stem, a conducting lead extending from the exterior of said receptacle through said stem and connected to said anode, a cathode seated upon said thimble, and means forming a conducting lead from the exterior of said receptacle to said cathode and holding the latter and said thimble against displacement in a direction away from the open end of said stem.

17. An electrical discharge device comprising, in combination, a gas-filled receptacle having an internal stem open at its inner end, an insulating thimble seated upon said stem and having a part extending downwardly about said stem, said thimble having an opening in its upper portion substantially coaxial with the open end of said stem, an anode substantially fitted into said opening and having a portion exposed above said thimble and a portion exposed to the open end of said stem, said downwardly extending part of said thimble holding the latter and said anode against displacement in a direction transversely of said stem, a cathode seated upon said thimble, said cathode and said thimble having portions that interfit, and conducting means extending from the exterior of said receptacle to said cathode and mechanically connected to hold said cathode down upon said thimble and said thimble against displacement in a direction away from the open end of said stem.

18. An electrical discharge device comprising, in combination, a gas-filled receptacle having an internal stem open at its inner end, an insulating thimble seated upon said stem and having a part extending downwardly about said stem, said thimble having an opening in its upper portion substantially coaxial with the open end of said stem, an anode substantially fitted into said opening and having a portion exposed above said thimble and a portion exposed to the open end of said stem, said downwardly extending part of said thimble holding the latter and said anode against displacement in a direction transversely of said stem, a two-part cathode, one part being interfitted with said thimble and having an opening through which said anode is exposed and the other part resting upon said first-mentioned part of the cathode, and conducting means extending from the exterior of said receptacle and into electrical contact with at least one of said parts of said cathode and mounted to assist in holding said two cathode parts together.

19. An electrical discharge device comprising, in combination, a gas-filled receptacle having an internal stem open at its inner end, an insulating thimble seated upon said stem and having a part extending downwardly about said stem, said thimble having an opening in its upper portion substantially coaxial with the open end of said stem, an anode substantially fitted into said opening and having a portion exposed above said thimble and a portion exposed to the open end of said stem, said downwardly extending part of said thimble holding the latter and said anode against displacement in a direction transversely of said stem, a two-part cathode, one part being interfitted with said thimble and having an opening through which said anode is exposed and the other part resting upon said first-mentioned part of the cathode, and conductive means holding said electrode parts on said thimble and holding the latter against displacement in a direction away from the open end of said stem and making electrical connection from the exterior of said receptacle to said cathode.

20. An electrical discharge device comprising, in combination, a gas-filled receptacle having an internal stem, an insulating thimble interfitted with said stem and having an opening therein, an electrode extending through said opening in said thimble, said thimble being stepped, an electrode engaging a stepped portion of said thimble and having a part held by said stepped portion in spaced relation to a part of said insulating thimble by a distance less than that at which substantial ionization may take place, and conductive means holding said second-mentioned electrode in engaging relation to said thimble and having an electrical connection made thereto from the exterior of said receptacle.

21. An electrical discharge device comprising, in combination, a gas-filled receptacle having an internal stem, an insulating thimble interfitted with said stem and having an opening therein, an electrode extending through said opening in said thimble, said thimble being stepped, an electrode engaging a stepped portion of said thimble and having a part held by said stepped portion in spaced relation to a portion of said first-mentioned electrode by a distance less than that at which substantial ionization takes place, and conductive means holding said second-mentioned electrode in engaging relation to said thimble and having an electrical connection made thereto from the exterior of said receptacle.

22. An electrical discharge device comprising, in combination, a gas-filled receptacle having an internal stem, insulating means carried by said stem and having an opening therein, an electrode projecting through said opening, a second electrode seated upon said insulating means and having a portion held by said insulating means spaced from said first-mentioned electrode by a distance less than that at which substantial ionization takes place, and conductive means holding said second-mentioned electrode in seated relation upon said insulating means and having an electrical connection made thereto from the exterior of said receptacle.

23. An electrical discharge device comprising, in combination, a gas-filled receptacle having an internal stem, insulating means carried by said stem and having an opening therein, an electrode projecting through said opening, a second electrode engaging said insulating means and positioned thereby for coaction with said first-mentioned electrode, a portion of one of said electrodes and a portion of said insulating means being spaced by a distance less than that at which substantial ionization takes place, and electrically conductive means holding said second-mentioned electrode in engaging relation to said insulating means and having an electrical connection made thereto from the exterior of said receptacle.

24. An electrical discharge device comprising, in combination, a gas-filled receptacle, an insulating member supported therein and having an opening therethrough, said opening being of round cross-section and having portions of different diameters, an anode passing through said insulating member and having a diameter substantially commensurate with that portion of said opening having the smallest diameter, a cathode seated upon said insulating member and having a round portion of a diameter to fit into another portion of said opening, and means holding said cathode in assembled relation to said insulating means.

25. An electrical discharge device comprising, in combination, a gas-filled receptacle, an insulating member supported therein and having an opening therethrough, said opening being of round cross-section and having portions of different diameters, an anode passing through said insulating member and having a diameter substantially commensurate with that portion of said opening having the smallest diameter, and a cathode having a flanged portion fitted into another portion of said opening, the flange of said portion surrounding said anode and spaced therefrom by a distance insufficient to maintain substantial ionization.

Signed by me at Medford Hillside, Mass., this twenty-fourth day of November, 1924.

JAMES L. JENKS, Jr.

CERTIFICATE OF CORRECTION.

Patent No. 1,841,288.  Granted January 12, 1932, to

JAMES L. JENKS, JR.

It is hereby certified that error appears in the printed specification of the above numbered patent requiring correction as follows: Page 4, lines 1 and 20, claims 9 and 10, respectively, for "substantially" read substantial; and that the said Letters Patent should be read with these correction therein that the same may conform to the record of the case in the Patent Office.

Signed and sealed this 22nd day of March, A. D. 1932.

(Seal)

M. J. Moore,
Acting Commissioner of Patents.